(No Model.)

T. H. BLAIR.
ROLL HOLDER FOR CAMERAS.

No. 428,797. Patented May 27, 1890.

Witnesses:
H. E. Rimick
Mattie J. Jackson

Inventor:
Thomas H. Blair
by Alban Andrèn his atty

UNITED STATES PATENT OFFICE.

THOMAS H. BLAIR, OF BOSTON, MASSACHUSETTS, ASSIGNOR TO THE BLAIR CAMERA COMPANY, OF MASSACHUSETTS.

ROLL-HOLDER FOR CAMERAS.

SPECIFICATION forming part of Letters Patent No. 428,797, dated May 27, 1890.

Application filed July 20, 1889. Serial No. 318,107. (No model.)

*To all whom it may concern:*

Be it known that I, THOMAS H. BLAIR, a citizen of the United States, and a resident of Boston, in the county of Suffolk and State of Massachusetts, have invented new and useful Improvements in Roll-Holders for Cameras, of which the following, taken in connection with the accompanying drawings, is a specification.

This invention relates to improvements in roll-holders for cameras, and it is carried out as follows, reference being had to the accompanying drawings, where—

Figure 1:
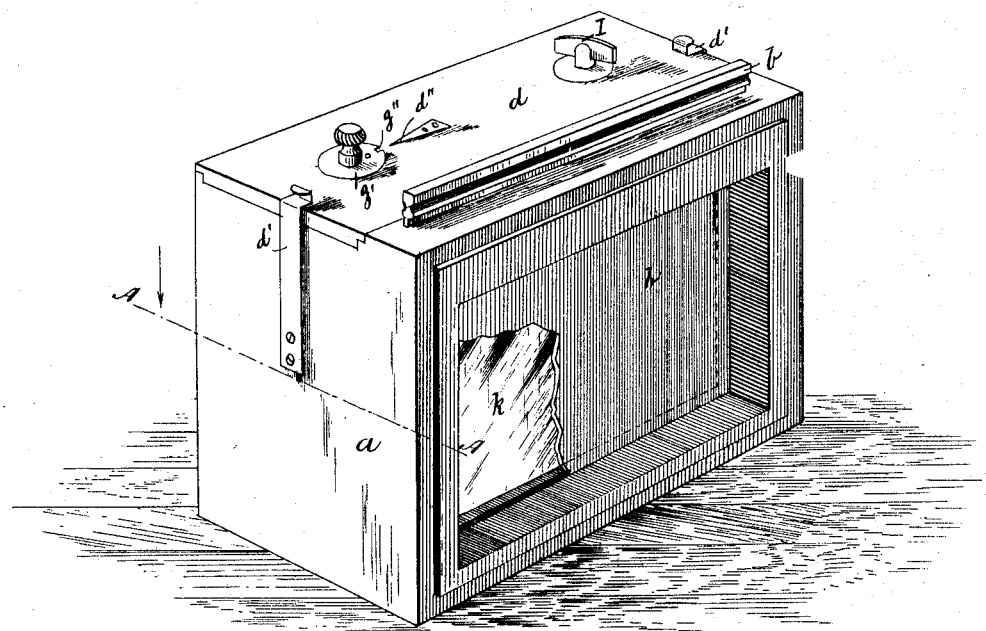
Figures 2, 3:
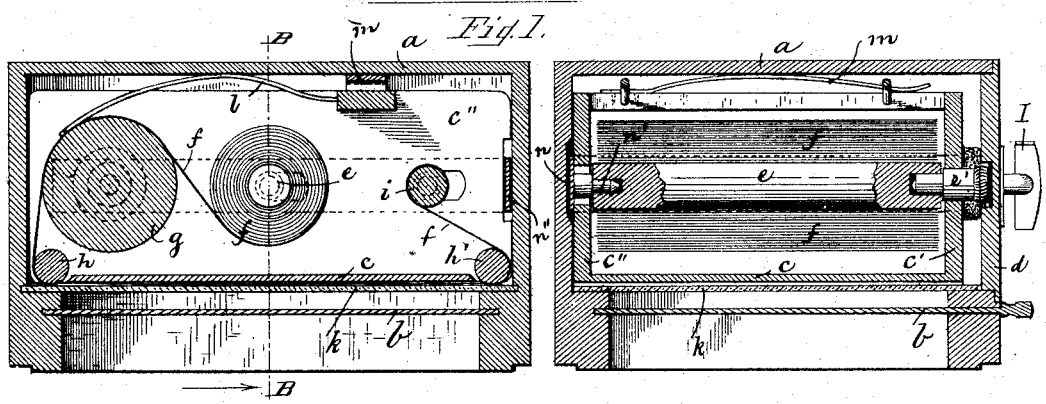
Figure 4:
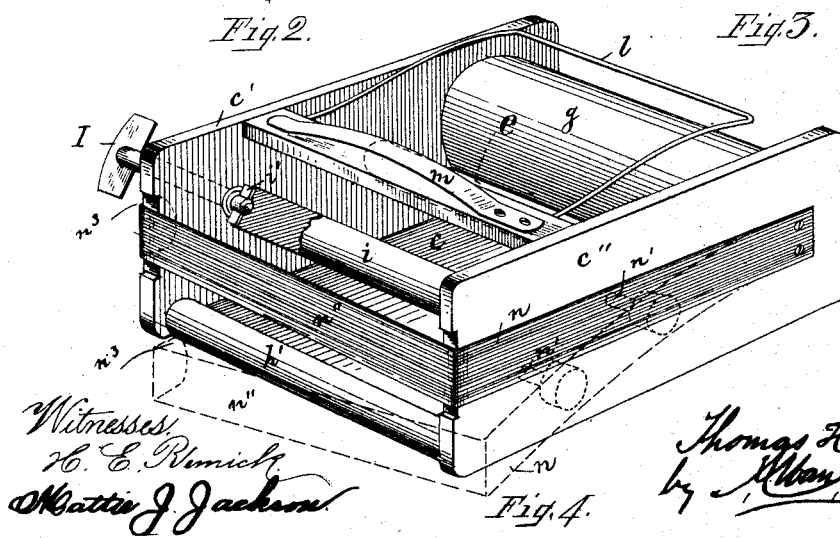

Figure 1 represents a perspective view of the improved roll-holder. Fig. 2 represents a horizontal section on the line A A, shown in Fig. 1. Fig. 3 represents a cross-section on the line B B, shown in Fig. 2; and Fig. 4 represents a perspective view of the roll-holder frame, shown as removed from the inclosing-box.

Similar letters refer to similar parts wherever they occur on the different parts of the drawings.

In carrying out my invention I make use of an inclosing-box $a$, having a slide $b$ in its forward end, as usual. Within the box $a$ is located the removable roll-holder frame, (shown in detail in Fig. 4,) which frame is composed of a front plate $c$ and top and bottom pieces $c'$ $c''$, as is usual in devices of this kind.

$d$ is a removable cover on the box $a$, as usual, which is held in locked position on the latter by means of suitable spring-catches $d'$ $d'$. (Shown in Fig. 1.)

$e$ is the supply-roller, containing the sensitive paper or film $f$, which, after passing over a portion of the measuring-roll $g$ and guide-roller $h$ $h'$, is wound on the receiving-roll $i$ in the ordinary manner.

In front of the plate $c$ of the roll-holder frame I arrange a transparent pane of glass $k$, secured in a suitable manner within the inclosing-box $a$, as shown in Figs. 1, 2, and 3. The said transparent glass pane $k$ is located close up to the plate $c$, with sufficient space between them to allow the sensitive paper or film $f$ to pass through, and by this arrangement and the influence of a spring $m$ said paper or film is kept flat and smooth at the place of exposure without the need of the usual tension devices, which may therefore be dispensed with in this my improved roll-holder.

The measuring-roller $g$ is loosely journaled in bearings in the top and bottom parts $c'$ $c''$ of the roll-holder frame and has its upper trunnion or journal projecting through the cover $d$ and provided with a washer $g'$, having a notch or recess $g''$ on its circumference, as shown in Fig. 1.

To the top of the cover $d$ is secured a pointer or index $d''$, the point of which is arranged in close proximity to the washer $g'$, as shown in said Fig. 1.

The circumference of the measuring-roll $g$ is equal to the amount of feed of the sensitive paper or film necessary for exposure. Consequently by turning the roller $i$ until it is ascertained that the roller $g$ and its washer $g'$ has made a complete revolution the proper feed for exposure of the sensitive paper or film is obtained.

If so desired, a spring $l$ may be used in the roll-holder frame, having its free end pressing on the sensitive paper or film where it passes over the measuring-roller $g$; but this is not essential.

$m$ is the spring, secured to the back of the roll-holder frame and pressing against the interior of the box $a$, for the purpose of pressing the plate $c$ of the roll-holder frame against the sensitive paper or film and the latter against the transparent pane $k$, so as to keep such sensitive paper or film perfectly smooth during its exposure.

To the upper end of the receiving-roll $i$ is secured in a suitable manner a handle or knob I, by means of which it is turned the required distance for making a new exposure on the sensitive paper or film after one exposure has been made. The receiving-roller $i$ is provided in its upper end with a nut $i'$, into which is screwed the inner end of the knob or handle I, as is common in devices of this kind. The upper end of the supply-roll $e$ is journaled on a removable pin $e'$, inserted through a perforation in the top piece $c'$ of the roll-holder frame, as shown in Fig. 3.

In devices of this kind it is essential that the supply and receiving rolls should be made easily detachable from the frame in which they are journaled to enable sensitive paper or film that has been exposed to be removed and replaced with a fresh one, and for this purpose I secure to the under side of the lower plate $c''$ of the roll-holder frame a metal spring-bar $n$, provided with cylindrical projections or trunnions $n'\,n'$, adapted to be inserted in end recesses in the respective rollers $e$ and $i$ when the roll-holder is to be used. The spring-bar $n$ has at its free end a vertical extension $n''$, terminating as a lip $n^3$, adapted to be locked onto the end of the upper piece $c'$ of the roll-holder frame, as shown in Fig. 4.

The dotted lines in Fig. 4 show the spring-bar $n\,n''$ sprung out of its normal position to enable the operator to remove the rollers $e\,i$ while detaching the exposed sensitive paper or film and replacing it with a fresh one.

Having thus fully described the nature, construction, and operation of my invention, I wish to secure by Letters Patent and claim—

1. In a roll-holder for cameras, the roll-holder frame consisting of plate $c$ and top and bottom pieces $c'\,c''$, and the rollers $e\,i$, supported therein, combined with the spring-metal plate $n$ and its trunnions $n'\,n'$, adapted to fit recesses in the lower ends of the rollers $e\,i$, substantially as and for the purpose set forth.

2. In a roll-holder for cameras, the roll-holder frame and the rollers $e\,i$, mounted therein, combined with the spring-metal plate $n$, having trunnions $n'\,n'$, adapted to fit recesses in the lower ends of the said rollers, and having an extension $n''$ and locking-lip $n^3$ for holding it in operative position on said roll-holder frame, substantially as and for the purpose set forth.

In testimony whereof I have signed my name to this specification, in the presence of two subscribing witnesses, on this 17th day of July, A. D. 1889.

THOMAS H. BLAIR.

Witnesses:
ALBAN ANDRÉN,
MATTIE JACKSON.